Inventor
ARTHUR A. BLUMENFELD
by David Pelton Moore
Attorney

Patented Aug. 30, 1932

1,874,231

UNITED STATES PATENT OFFICE

ARTHUR A. BLUMENFELD, OF NEW YORK, N. Y., ASSIGNOR TO GENERAL TALKING PICTURES CORPORATION, OF NEW YORK, N. Y., A CORPORATION OF DELAWARE

APPARATUS FOR MICROSCOPIC ADJUSTING OF OPTICAL SYSTEMS

Application filed December 24, 1930. Serial No. 504,575.

In producing the best possible effects in sound-on-film reproduction it is necessary that the area of the light projected upon and through the film to affect the photo-electric cell be as clearly cut as is possible, and it is therefore necessary to adjust the optical system to be used in sound reproducing apparatus so that the slit image produced thereby will be properly projected upon the film and as it is impractical to make this adjustment in the apparatus, it is advisable to make such adjustment in the laboratory.

It is, therefore, the object of the present invention to produce a simple method and apparatus whereby the optical system may be adjusted in the laboratory so that when the same by such adjustment is properly inspected and checked that the same can be readily assembled within a sound-on-film sound head as a tested optical system so that the best possible results will be obtained in the reproduction of sound from the film.

One object of the present invention is therefore to produce a simple mechanism by means of which this test can be performed in the laboratory in a rapid and thorough manner and with simple mechanism.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—

Figure 1:
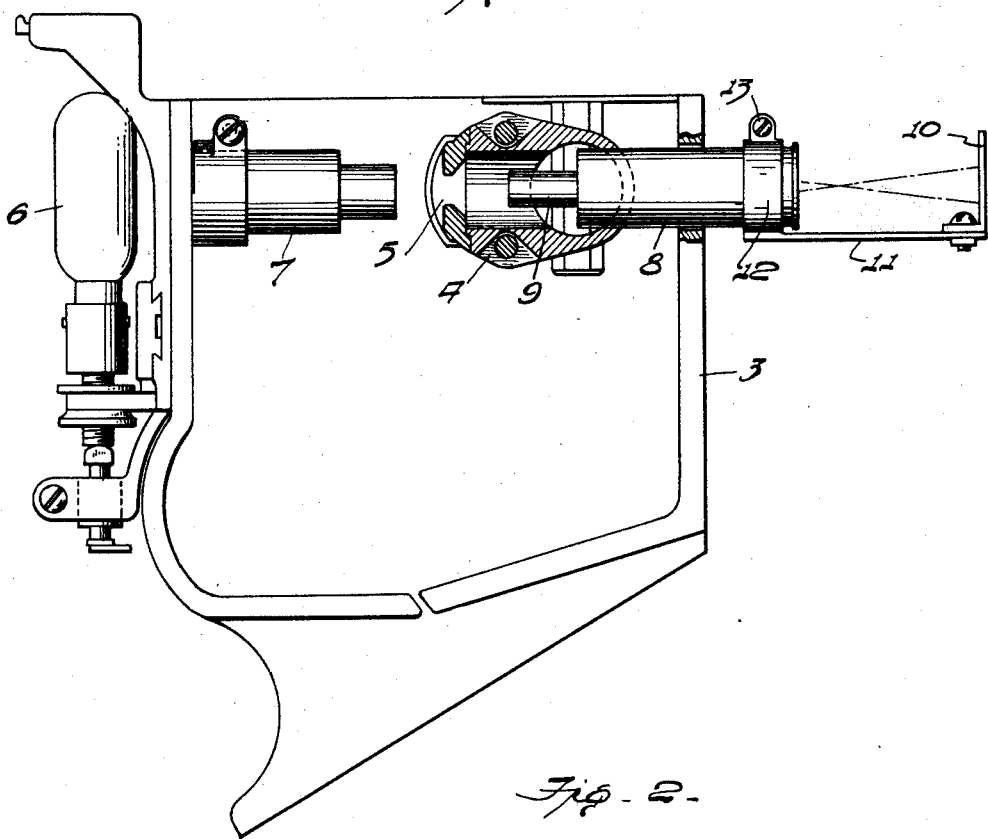
Figure 1 is a side elevation, partly in section and in diagram of the complete apparatus showing one of the optical systems in use therewith and with the slit block shown partly in section to indicate how the light from the exciter lamp is directed to and through the optical system.
Figure 2:
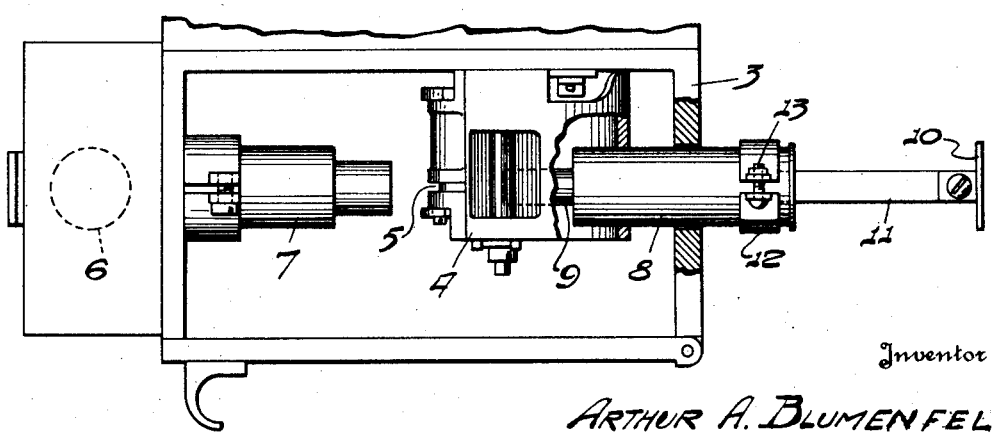
Figure 2 is a top plan view thereof.

In testing optical systems herebefore, it has been necessary for the engineer to look through a microscope at the tiny image of the slit, while with the present apparatus an enlarged slit image is thrown on a small screen, which is supported at the end of the microscope rendering the image easy to examine and in a more rapid and thorough manner.

To accomplish this result a sound head 3 which is provided with a slit block 4 having the light slit 5 is provided and in conjunction therewith an exciter lamp 6, and an optical system 7 is provided, this being a substantial arrangement of the respective parts in a sound-on-film sound head. A microscope 8 has its smaller end 9 projected into and supported by the slit block 4 so that the inner end thereof will be aligned with the slit 5 through which the slit image of the optical slit 7 is projected. This image is therefore enlarged by the microscope 8 and is projected upon the screen 10.

This screen 10 as seen is carried by an arm 11 whose collar 12 adjustably surrounds the microscope 8 and longitudinally adjustable therein through the adjusting screw 13 so that the screen may be moved nearer or farther away, within certain limits, from the outer end of the microscope.

It will thus be seen that with this arrangement the slit image projected upon the screen 10 will be greatly enlarged and can be more readily examined by the engineer within the laboratory so that the inspection of the optical system 7 may be more rapidly and efficiently determined.

What is claimed is:

1. The combination with a sound head, an exciter lamp disposed exteriorly thereof, a tubular clamp carried by the sound head and the axis of which is in alignment with the filament of the exciter lamp, an optical system provided with a slit forming member and removably mounted in the clamp, a slit block mounted in the sound head and provided with a slit aperture through which the slit image projected by the optical system is observable, said slit block being provided with a bore in alignment with the slit aperture, said slit block being further provided with an opening in the rear wall, the axis of which is coaxial with that of the optical system, the sound head being provided with an opening concentric with the latter opening of the slit block, a microscope the enlarged portion of which is removably mounted in both of said aligned openings with the reduced end projected within the aligned bore of the slit block for longitudinal sliding movement, and means adjustably carried upon the outer end of the microscope for receiving an enlarged image of the optical slit.

2. The combination as set forth in claim 1 wherein the latter means includes a clamp for adjustably encircling the enlarged outer end of the microscope, an arm carried thereby and extending away from the enlarged end of the microscope, and a screen carried upon the free end of said arm and extending upwardly and in parallel to the outer face of the microscope to receive the slit image of the optical system thereof.

In testimony whereof I affix my signature.

ARTHUR A. BLUMENFELD.